United States Patent
Qian et al.

(10) Patent No.: US 11,907,391 B2
(45) Date of Patent: Feb. 20, 2024

(54) METHOD FOR PERFORMING SEGMENTING LOCKING AND MERGING CONTROL OF ENCRYPTED DIGITAL ASSETS BASED ON TIME DIMENSION

(71) Applicant: SHANGHAI FENFU INFORMATION TECHNOLOGY CO., LTD., Shanghai (CN)

(72) Inventors: Dejun Qian, Shanghai (CN); Guochang Xu, Shanghai (CN); Zhaojun He, Shanghai (CN); Bin Jiang, Shanghai (CN)

(73) Assignee: SHANGHAI JIANWEI ZHIZHU ENTERPRISE MANAGEMENT CENTER (LIMITED PARTNERSHIP), Shanghai (CN)

( * ) Notice: Subject to any disclaimer, the term of this patent is extended or adjusted under 35 U.S.C. 154(b) by 578 days.

(21) Appl. No.: 17/109,670

(22) Filed: Dec. 2, 2020

(65) Prior Publication Data
US 2021/0089677 A1    Mar. 25, 2021

Related U.S. Application Data

(63) Continuation-in-part of application No. PCT/CN2018/089805, filed on Jun. 4, 2018.

(51) Int. Cl.
*G06F 21/62* (2013.01)
*G06F 21/10* (2013.01)
*G06F 21/60* (2013.01)

(52) U.S. Cl.
CPC ......... *G06F 21/6227* (2013.01); *G06F 21/10* (2013.01); *G06F 21/602* (2013.01); *G06F 21/108* (2023.08); *G06F 2221/2147* (2013.01)

(58) Field of Classification Search
CPC .... G06F 21/6227; G06F 21/10; G06F 21/602; G06F 2221/0779; G06F 2221/2147
See application file for complete search history.

(56) References Cited

U.S. PATENT DOCUMENTS

| 2017/0091726 A1* | 3/2017 | Morgan | G06Q 20/065 |
| 2018/0191503 A1* | 7/2018 | Alwar | H04L 9/14 |

(Continued)

FOREIGN PATENT DOCUMENTS

| CN | 105956923 A | 9/2016 |
| CN | 107194778 A | 9/2017 |

OTHER PUBLICATIONS

Int'l Search Report for PCT/CN2018/089805, dated Mar. 4, 2019.

*Primary Examiner* — Jung W Kim
*Assistant Examiner* — Alan Lingqian Kong
(74) *Attorney, Agent, or Firm* — MaxGoLaw PLLC

(57) ABSTRACT

A method for performing segmenting locking and merging control of encrypted digital assets based on time dimension is provided. The method being mainly provided to achieve segmenting locking and merging control of encrypted digital assets by adding a time attribute to encrypted digital asset. Using the method for performing segmenting locking and merging control of encrypted digital assets based on time dimension of the present invention, through the processing of encrypted digital assets in the time dimension, which not only can use smart contracts or hash locking to realize the automated transfer of encrypted digital assets in the future, and the transferred encrypted digital asset before the set time, also can transfer and transaction; meanwhile, since the segmentation object is based on the assets currently held by the user, therefore the deterministic payment of future value rights also can be ensured, has a wider range of applications.

8 Claims, 1 Drawing Sheet

(56) References Cited

U.S. PATENT DOCUMENTS

2019/0028276 A1* 1/2019 Pierce ................ G06Q 20/3825
2019/0333058 A1* 10/2019 Hong ........................ H04L 9/50
2020/0279256 A1* 9/2020 Wright ............... G06Q 20/3829

* cited by examiner

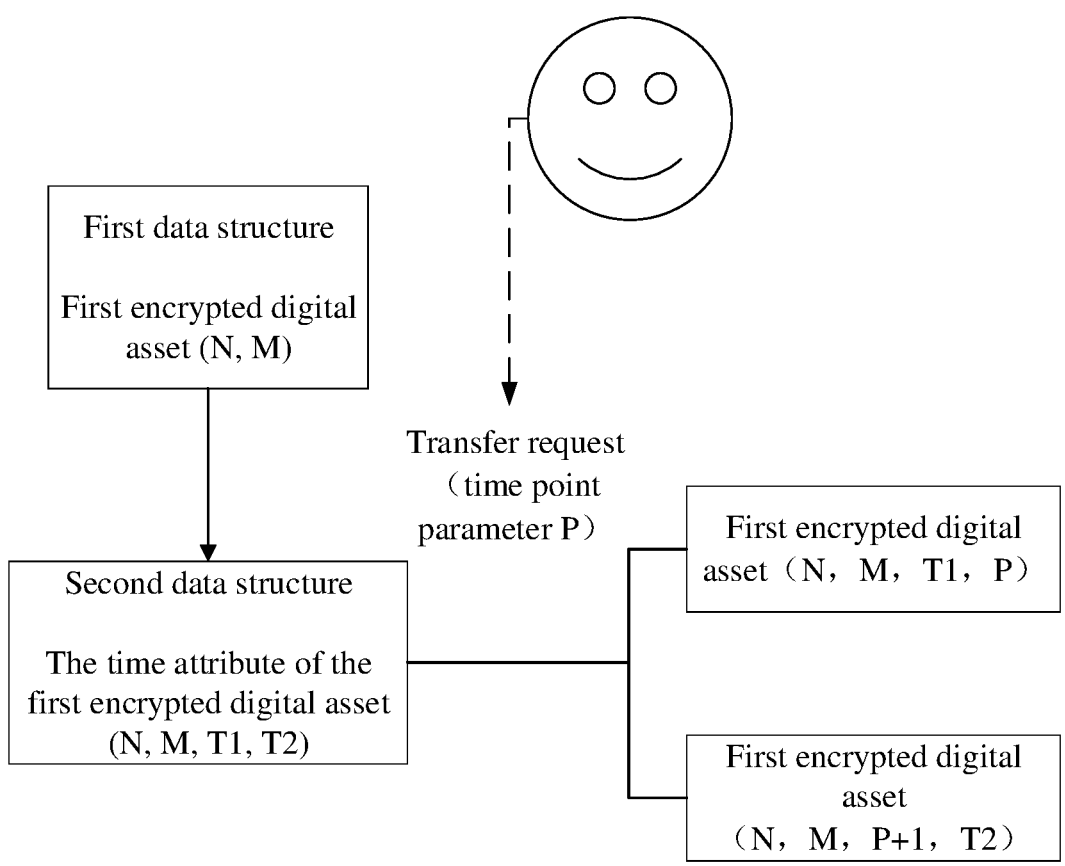

METHOD FOR PERFORMING SEGMENTING LOCKING AND MERGING CONTROL OF ENCRYPTED DIGITAL ASSETS BASED ON TIME DIMENSION

RELATED APPLICATIONS

This application is a "bypass" continuation-in-part of PCT Application Number PCT/CN2018/089805 filed 4 Jun. 2018; the contents of which are hereby incorporated by reference.

FIELD OF TECHNOLOGY

The present invention relates to the technical field of blockchain, in particular to the technical field of time division of encrypted digital assets, specifically, it refers to a method for performing segmenting locking and merging control of encrypted digital assets based on time dimension.

DESCRIPTION OF RELATED ARTS

At present, typical digital assets controlled and managed by a key take encrypted digital currency as an example, digital currency has two attributes, one is the name of a currency, and the other is its value, which is usually described in the form of a certain number of digital currencies.

Here we mark the name of the digital currency as N and its corresponding amount as M, then no matter whether the blockchain uses UTXO (Unspent Transaction Outputs) or the account system of Account, from the perspective of the user, the assets that some user holds at a certain moment could be represented by the following model:

$(N,M);$ namely, the user owns M encrypted digital currencies named N.

Correspondingly, what the existing blockchain realizes is to segment the digital assets held by users in quantity, for example, divide (N, M) at the current moment into (N, m1) and (N, m2) at the next moment, where:

$M=m1+m2;$ according to this, we can see that such segmentation is an atomic segmentation of digital assets about quantity at a certain point in time, which is suitable for application scenarios of instant transaction settlement.

However, as we know, in the traditional financial field, the existence of financial activities and businesses about future value rights, for example, accept a bill of exchange, is based on the payer's credit standing and respectability (comprises mortgage and credit), the bank acts as a third-party attestation and guarantee, ensure to unconditional payment of a certain amount to the payee on the specified date, to realize financial behavior that the exchange of value across time. On the basis of accept a bill of exchange, commercial transaction financing further derives acceptance financing business and markets.

In the field of crypto finance, there are also financial behaviors that realize unconditional payment of a certain value to a specific payer on a specified date for encrypted digital currency. But current digital currencies such as Bitcoin do not have this function.

SUMMARY OF THE INVENTION

The object of the present invention is to overcome the drawbacks of the prior arts, to provide a method for performing segmenting locking and merging control of encrypted digital assets based on time dimension.

In order to achieve the above objects, the present invention of method for performing segmenting locking and merging control of encrypted digital assets based on time dimension has the following composition:

The method for performing segmenting locking of encrypted digital assets based on time dimension, characterized in that, the said method comprises: a first user terminal stores a first encrypted digital asset (N, M) in a first data structure which belongs to the first user terminal, and add attributes for a time period interval (T1, T2) of the first encrypted digital asset (N, M) to a second data structure which belongs to the first user terminal, in order to expand the first encrypted digital asset (N, M) into a second encrypted digital asset (N, M, T1, T2) having attributes for the time period interval (T1, T2); based on the second data structure, the first user terminal's ownership related to the first encrypted digital asset (N, M) in the time period interval (T1, T2) could be separated into the right to use of a second user terminal related to the first encrypted digital asset (N, M) in a time period interval (T1, P), and the first user terminal's ownership related to the first encrypted digital asset (N, M) in a time period interval (P+1, T2), the said T1, P, T2 are any positive integers, and the T1<P<T2.

In the method for performing segmenting locking of encrypted digital assets based on time dimension, the said first data structure is data structure of Account, the second data structure is data structure of UTXO or data structure of Hybrid Model.

In the method for performing segmenting locking of encrypted digital assets based on time dimension, before the first user terminal's ownership related to the first encrypted digital asset (N, M) in the time period interval (T1, T2) is separated, the second data structure needs to receive a transfer request related to the first encrypted digital asset (N, M) initiated by the first user terminal in a first account model, the transfer request comprises the time point parameter P.

In the method for performing segmenting locking of encrypted digital assets based on time dimension, the said right to use comprises the transfer and exchange of the first encrypted digital asset (N, M).

In the method for performing segmenting locking of encrypted digital assets based on time dimension, after the first user terminal's ownership related to the first encrypted digital asset (N, M) in the time period interval (T1, T2) is separated, the first data structure will eliminate the transferred first encrypted digital asset (N, M).

A method for realizing merging control of encrypted digital assets based on time dimension, based on the above method for segmenting locking, characterized in that, the said method comprises: in the second data structure, based on the first user terminal's ownership related to the first encrypted digital asset in the time period interval P+1 to T2, and according to that after the right to use of the second user related to the first encrypted digital asset in the time period interval Q to P has been obtained, the first user terminal could obtain the ownership related to the first encrypted digital asset in the time period Q to T2, the said Q is any positive integers, and the T1<Q<P<T2.

In the method for performing merging control of encrypted digital assets based on time dimension, the said method also comprises: the first encrypted digital asset is added to the first data structure.

In the method for performing merging control of encrypted digital assets based on time dimension, the said first data structure is data structure of Account, the second data structure is data structure of UTXO or data structure of Hybrid Model.

Using the method for performing segmenting locking and merging control of encrypted digital assets based on time dimension in this invention, through the processing of encrypted digital assets in the time dimension, not only can smart contracts or hash locking be used to realize the automated transfer of encrypted digital assets in the future, and the transferred encrypted digital assets can be transferred and traded before the set time (such as T2 of the present invention); at the same time, since the segmentation object of the present invention is based on the assets currently held by the user, therefore, the deterministic cash of future value rights and interests can ensure to be realize, and it has a wider range of applications.

BRIEF DESCRIPTION OF THE DRAWINGS

FIG. 1 is an explanatory diagram of the adaptability of the method for segmenting locking of encrypted digital assets based on time dimension of the present invention.

DETAILED DESCRIPTION OF THE PREFERRED EMBODIMENT

In order to be able to understand the technical content of the present invention more clearly, is further exemplified by the following detailed description of embodiments.

A method for performing segmenting locking of encrypted digital assets based on time dimension of the present invention, comprises: a first user terminal stores a first encrypted digital asset (N, M) in a first data structure which belongs to the first user terminal, and add attributes for a time period interval (T1, T2) of the first encrypted digital asset (N, M) to a second data structure which belongs to the first user terminal, in order to expand the first encrypted digital asset (N, M) into a second encrypted digital asset (N, M, T1, T2) having attributes for the time period interval (T1, T2); based on the second data structure, the first user terminal's ownership related to the first encrypted digital asset (N, M) in the time period interval (T1, T2) could be separated into the right to use of a second user terminal related to the first encrypted digital asset (N, M) in a time period interval (T1, P), and the first user terminal's ownership related to the first encrypted digital asset (N, M) in a time period interval (P+1, T2), the said T1, P, T2 are any positive integers, and the T1<P<T2.

In the method for performing segmenting locking of encrypted digital assets based on time dimension, the said first data structure is data structure of Account, the second data structure is data structure of UTXO or data structure of Hybrid Model.

In the method for performing segmenting locking of encrypted digital assets based on time dimension, before the first user terminal's ownership related to the first encrypted digital asset (N, M) in the time period interval (T1, T2) is separated, the second data structure needs to receive a transfer request related to the first encrypted digital asset (N, M) initiated by the first user terminal in a first account model, the transfer request comprises the time point parameter P.

In the method for performing segmenting locking of encrypted digital assets based on time dimension, the said right to use comprises the transfer and exchange of the first encrypted digital asset (N, M).

In the method for performing segmenting locking of encrypted digital assets based on time dimension, after the first user terminal's ownership related to the first encrypted digital asset (N, M) in the time period interval (T1, T2) is separated, the first data structure will eliminate the transferred first encrypted digital asset (N, M).

A method for realizing merging control of encrypted digital assets based on time dimension, based on the above method for segmenting locking, comprises: in the second data structure, based on the first user terminal's ownership related to the first encrypted digital asset in the time period interval P+1 to T2, and according to that after the right to use of the second user related to the first encrypted digital asset in the time period interval Q to P has been obtained, the first user terminal could obtain the ownership related to the first encrypted digital asset in the time period Q to T2, the said Q is any positive integers, and the T1<Q<P<T2.

In the method for performing merging control of encrypted digital assets based on time dimension, the said method also comprises: the first encrypted digital asset is added to the first data structure.

In the method for performing merging control of encrypted digital assets based on time dimension, the said first data structure is data structure of Account, the second data structure is data structure of UTXO or data structure of Hybrid Model.

In a specific embodiment, the present invention adds time attributes related to encrypted digital assets to realize segmenting locking and merging, take the currently commonly used Account and UTXO data structures as examples, the method of recording time attributes in other data structures to realize segmenting locking and merging of digital assets also belongs to the protection content of the present invention:

(1) First of all, introduce a time parameter P into the model, where P represents a point between T1 and T2. Assuming P=p to perform the Time Lock operation, it is to split the encrypted digital asset (N, M, T,∞) into (N, M, T, p) and (N, M, p+1,∞) at a time point in the future. Among them on the timeline:

$$(T,p) \cup (p+1,\infty) = (T,\infty)$$

this completes the segmentation operation for the Time Lock of the digital asset (M, N) at the future time point p;

(2) record the digital assets currently owned by the user in the form of (N, M) in the user's account of Account, the assets with time attributes (N, M, ct,∞) are reflected in the UTXO account.

The UTXO is an account accounting system, for example, there is an Account system in Ethereum, like a bank account, everyone has a ledger to record balance information. But Bitcoin compared to it is different, Bitcoin is the unused UTXO obtained as an account system, the total balance that Bitcoin users can use is obtained by summing up all UTXOs.

There are two sources of unspent in UTXO account:

(2.1) it is derived from part or all of a certain asset held in the user's own account of Account. While transferring these assets into the UTXO account system, the same type and quantity of digital assets will be correspondingly subtracted from the account of Account to ensure the validity of the initial source of UTXO in the entire system. The realization process has the following characteristics:

users can only initiate transfers from their own account of Account to their own UTXO account;

the transfer process is performed atomically;

(2.2) another method of obtaining is the transfer of UTXO from other users, which is equivalent to that the user as the recipient obtains a right to use or future ownership. The UTXO of the present invention adopts an unspent structure similar to the existing UTXO, but expands the parameters recorded by the UTXO and adds two time parameters, namely T1 and T2, thereby supporting the (N, M, T1, T2) model;

(3) segment operation of Time Lock:

(3.1) user A initiates a transfer operation from its own account of Account to UTXO about the digital assets (N, M) existing in the current account of Account, and passes in a parameter P, where p is the value of P and satisfies the condition of $ct<p<\infty$;

(3.2) deduct the corresponding digital asset (N, M) in user A's account of Account, and form a record of (N, M, ct,∞) in UTXO, and according to the incoming parameter P=p, to execute $$(N,M,ct,\infty)p=(N,M,ct,p)+(N,M,p+1,\infty)$$

thus, user A obtains a right to use the digital asset (N, M) in the time period [ct, p], and the future ownership of the digital asset (N, M) at the future time point p+1.

(4) Flow:

user A can transfer the formed (N, M, ct, p) and (N, M, p+1,∞) respectively to UTXO accounts of different users.

among them, when user A transfers (N, M, p+1,∞) to user B, it is equivalent to that user B obtains a future ownership of digital assets (N, M) at time point p+1, and user A will lose ownership of these assets.

(5) Judging the time attribute of UTXO:

when user B obtains a (N, M, p+1,∞), he can choose to wait until ct≥p+1, and he can directly obtain the ownership of (N, M).

Or user B can seek to obtain a right to use (N, M) with [T1, T2]=[ct, t'], as long as user B obtains t'≥p, then user B can through $$(N,M,ct,t')+(N,M,p-1,\infty)=(N,M,ct,\infty)$$

obtain current ownership of digital assets (N, M).

Similarly, users can obtain multiple [T1, T2] use rights of (N, M), as long as the time period [ct, p] is covered, the user can obtain the current right to use (N, M).

The judgment of the time attribute of UTXO will be done with the help of a filter for the time attribute of UTXO, this filter will determine whether the time parameter of UTXO meet the continuity of the target digital asset (N, M) in the time period [ct,∞]. When the conditions are met, the UTXO with time attribute is converted into standard UTXO for operation.

(6) Time Lock merge operation (6.1) User A is in his UTXO account, choose the continuous one that satisfies [ct,∞] in the relevant time period, a UTXO fragment on a digital asset (N, M), execute $$(N,M,t,t')+(N,M,t'+1,\infty)=(N,M,t,\infty)$$

(6.2) at the same time, delete the related UTXO record in the UTXO record of user A (for example, by locking to a special target address), and increase the record of (N, M) in the user A's account Account.

This operation also needs to meet the following two requirements:

users can only merge Time Lock in their own UTXO and account of Account;

the above operation is completed atomically.

Using the method for performing segmenting locking and merging control of encrypted digital assets based on time dimension in this invention, through the processing of encrypted digital assets in the time dimension, not only can smart contracts or hash locking be used to realize the automated transfer of encrypted digital assets in the future, and the transferred encrypted digital assets can be transferred and traded before the set time (such as T2 of the present invention); at the same time, since the segmentation object of the present invention is based on the assets currently held by the user, therefore, the deterministic cash of future value rights and interests can ensure to be realize, and it has a wider range of applications.

In this specification, the present invention has been described with the reference to its specific embodiments. However, it is obvious still may be made without departing from the spirit and scope of the present invention, various modifications and transformation. Accordingly, the specification and drawings should be considered as illustrative rather than restrictive.

We claim:

1. A method for performing segmenting locking of encrypted digital assets based on time dimension, the method comprising:

storing on a first user terminal a first encrypted digital asset (N, M) of a type of currency N and an amount of the currency M in a first data structure of the first user terminal;

adding attributes for an overall time period interval (T1, T2) of the first encrypted digital asset (N, M) to a second data structure of the first user terminal, in order to expand the first encrypted digital asset (N, M) into a second encrypted digital asset (N, M, T1, T2) having attributes for the overall time period interval (T1, T2), where T1 is a start timestamp of a user's possession of the digital asset (N, M) and T2 is an end timestamp of the user's possession of the digital asset (N, M);

separating, based on the second data structure, the first user terminal's ownership related to the first encrypted digital asset (N, M) in the overall time period interval (T1, T2) into a right to use of a second user terminal related to the first encrypted digital asset (N, M) in a first time period interval (T1, P), and the first user terminal's ownership of the first encrypted digital asset (N, M) in a second time period interval (P+1, T2), wherein the first time period interval (T1, P) spans between the start timestamp T1 of a user's possession of the digital asset (N, M) and an intervening timestamp P that is between the start timestamp T1 and the end timestamp T2, wherein the second time period interval (P+1, T2) spans between a second after the intervening timestamp P and the end timestamp T2, and wherein the start timestamp T1, the intervening timestamp P, and the end timestamp T2 are any positive integers, and the T1<P<T2; and assuming the intervening timestamp P is equal to a time to preform the time lock operation (p) and splitting the encrypted digital asset (N, M) into (N, M, T, p) and (N, M, p+1,∞) at a time point in the future to complete the segmentation operation for the time lock of the digital asset (M, N) at the future time point p.

2. The method for performing segmenting locking of encrypted digital assets based on time dimension according to claim 1, wherein the first data structure is data structure of Account, the second data structure is data structure of UTXO (Unspent Transaction Outputs) or data structure of Hybrid Model.

3. The method for performing segmenting locking of encrypted digital assets based on time dimension according to claim 1, wherein before the first user terminal's ownership related to the first encrypted digital asset (N, M) in the overall time period interval (T1, T2) is separated, the second data structure receives a transfer request related to the first encrypted digital asset (N, M) initiated by the first user terminal in a first account model, the transfer request comprises the intervening timestamp P.

4. The method for performing segmenting locking of encrypted digital assets based on time dimension according to claim 1, wherein the right to use comprises the transfer and exchange of the first encrypted digital asset (N, M).

5. The method for performing segmenting locking of encrypted digital assets based on time dimension according to claim 1, wherein after the first user terminal's ownership of the first encrypted digital asset (N, M) in the overall time period interval (T1, T2) is separated, the first data structure will eliminate the transferred first encrypted digital asset (N, M).

6. The method for performing segmenting locking of encrypted digital assets based on time dimension according to claim 1, further comprising realizing merging control of encrypted digital assets based on time dimension wherein in the second data structure, based on the first user terminal's ownership of the first encrypted digital asset in the second time period interval (P+1, T2), and according to that after the right to use of the second user the first encrypted digital asset in a third time period interval Q to P has been obtained, the first user terminal could obtain ownership related to the first encrypted digital asset in a fourth time period Q to T2, where Q is any positive integers and a timestamp after the start timestamp T1 and before the intervening timestamp P, and the T1<Q<P<T2.

7. The method for performing segmenting locking of encrypted digital assets based on time dimension according to claim 6 wherein merging control of encrypted digital assets based on time dimension further comprises adding the first encrypted digital asset to the first data structure.

8. The method for performing segmenting locking of encrypted digital assets based on time dimension according to claim 6 wherein when merging control of encrypted digital assets based on time dimension the first data structure is data structure of Account, the second data structure is data structure of UTXO or data structure of Hybrid Model.

* * * * *